D. W. UBER.
MEASURING APPARATUS.
APPLICATION FILED AUG. 8, 1916.
1,228,991.
Patented June 5, 1917.
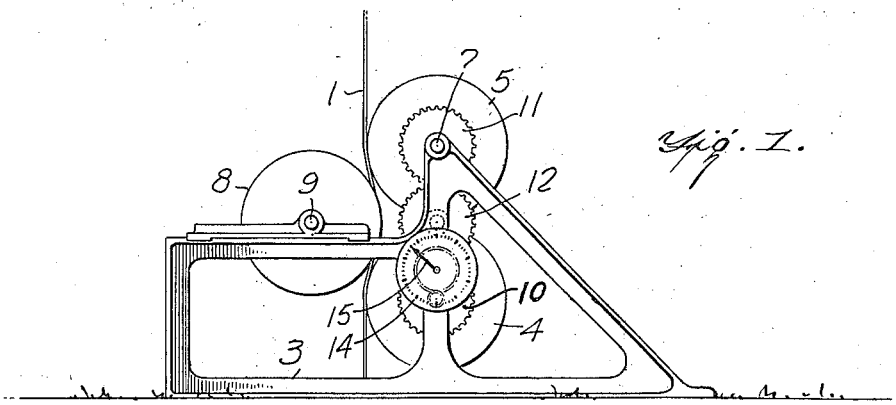
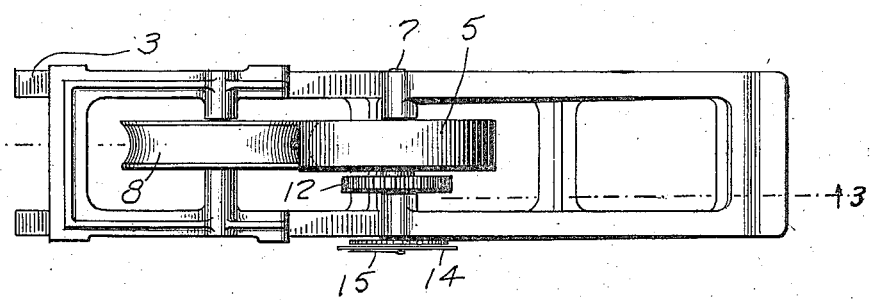
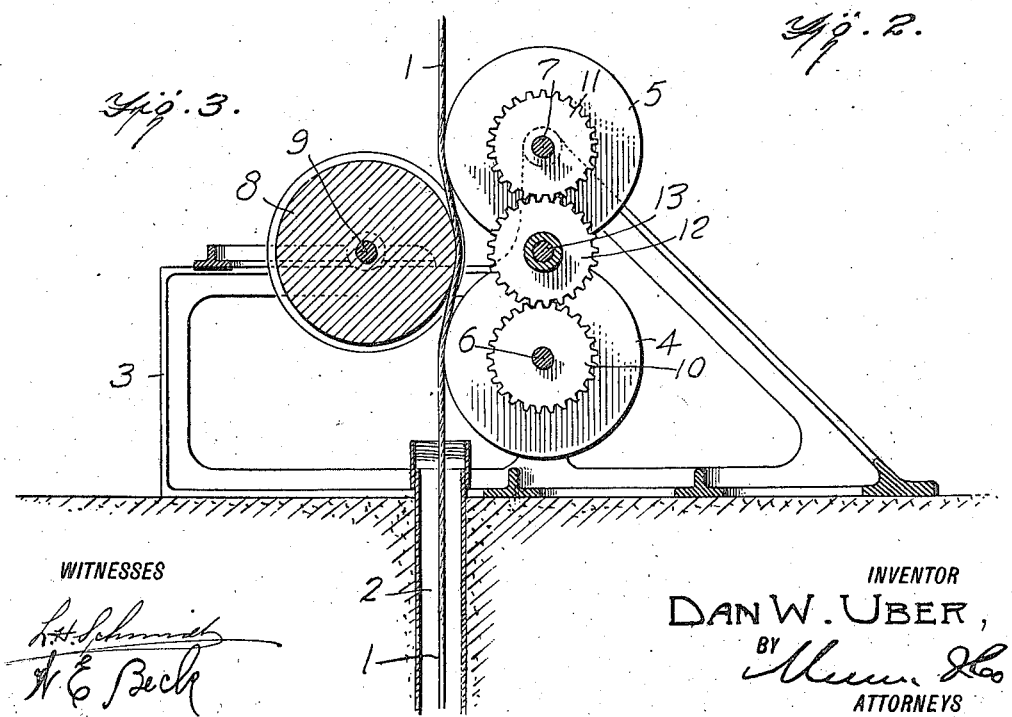
WITNESSES
INVENTOR
DAN W. UBER,
BY
ATTORNEYS

UNITED STATES PATENT OFFICE.

DAN W. UBER, OF SHEFFIELD, PENNSYLVANIA.

MEASURING APPARATUS.

1,228,991.    Specification of Letters Patent.    Patented June 5, 1917.

Application filed August 8, 1916. Serial No. 113,752.

*To all whom it may concern:*

Be it known that I, DAN W. UBER, a citizen of the United States, and a resident of Sheffield, in the county of Warren and State of Pennsylvania, have invented a certain new and useful Improvement in Measuring Apparatus, of which the following is a specification.

My invention is an improvement in measuring apparatus, and has for its object to provide a mechanism of the character specified by means of which the depth of a well may be ascertained without the use of a measuring line, by measuring the rope or cable of the well.

In the drawings:

Figure 1 is a side view of the improved apparatus;

Fig. 2 is a top plan view; and

Fig. 3 is a section on the line 3—3 of Fig. 2, looking in the direction of the arrows adjacent the line.

The present embodiment of the invention is shown in connection with a rope or cable 1 of a well, indicated at 2, and the apparatus comprises a supporting frame 3 adapted to be arranged over the well, as shown, and with the rope or cable passing down through the frame, and a measuring mechanism mounted on the frame.

The said mechanism comprises a lower and an upper roller or wheel, 4 and 5 respectively, and said rollers or wheels are mounted upon shafts 6 and 7 which are journaled in bearings in the frame. These rollers 4 and 5 are of the same size, preferably with a circumference of exactly twenty-four inches, and their peripheral surfaces are flat as shown.

The roller 5 is mounted directly above the roller 4 and the axes of the rollers are in the same vertical plane. A pressure roller 8 is arranged between the rollers 4 and 5, and said pressure roller has a grooved periphery as shown. This roller is secured to a shaft 9 which is journaled in bearings on the frame. The shaft of roller 8 is halfway between the shafts 6 and 7, and is spaced apart from the vertical plane of the said shafts a distance less than the radius of the roller 8 plus the radius of the rollers 4 and 5. With this arrangement, the peripheral surface of the roller 8 extends beyond and within the common tangent of the rollers 4 and 5 in such manner that when the rope or cable 1 is passing between the rollers 4 and 5 and 8, it will be bent or deflected laterally, as shown, by roller 8. The rollers 4 and 5 are constrained to rotate in the same direction and at the same rate of speed by a gearing, seen in Fig. 1.

This gearing comprises gear wheels 10 and 11 secured to the shafts 4 and 5 respectively, and between the said gear wheels 10 and 11 is arranged another gear wheel 12. The gear wheels 10, 11, and 12 are of the same diameter, and the gear wheel 12 is an idler, having a hub journaled on a stub shaft 13 also mounted in the frame.

An indicator 14, of any usual structure, is arranged to be driven by the shaft 6 of the roller 4. This indicator records either the number of revolutions of the roller 4 or the number of feet traveled by the periphery of the roller; in other words, the scale with which the indicator hand 15 of the indicator coöperates, will indicate the number of revolutions of the roller or the number of feet traveled by the periphery. In the former case, the indications would be multiplied by two with the twenty-four inch roller to obtain the length of the line 1 in feet; while in the latter case the indicator would indicate the number of feet in the line.

It will be evident that when the line is lowered until the tools strike bottom, or, with a weight on the line, until the weight strikes the bottom, passing between the rollers as it is lowered, the indicator will furnish a record of the length of the line, that is, of the amount passed into the well casing, and as a consequence to the depth of the well.

I claim:—

A measuring device for ascertaining the depth of wells or the like, by measuring the rope or cable of the well, and comprising a supporting frame adapted to be arranged above the well, a pair of similar rollers of the same diameter journaled in the frame, one above the other, and with their axes in the same vertical plane, a pressing roller journaled between the axes of the measuring rollers and laterally with respect to the vertical plane through the axes, and at a distance less than the aggregate length of the radii of the said pressing roller and one of the measuring rollers, to cause a portion of the periphery of the pressing roller to extend inside the common tangent of the measuring rollers, means for constraining the measuring rollers to rotate in the same direction and at the same speed, said means comprising gear wheels on the rollers and an idler connecting the gear wheels, said idler and gear wheels being of the same diameter and an indicating device in connection with the lower measuring roller.

DAN W. UBER.